May 12, 1964  G. F. LAMBETH  3,133,130
TREATMENT TANK FOR AEROBICALLY PURIFYING WASTE LIQUIDS
Filed Sept. 24, 1959
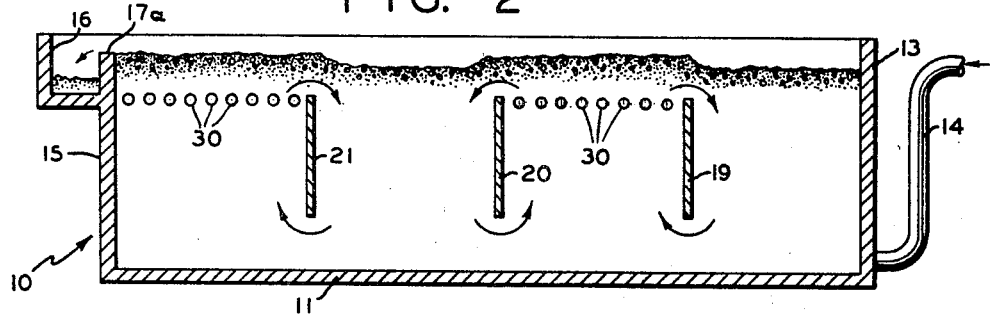
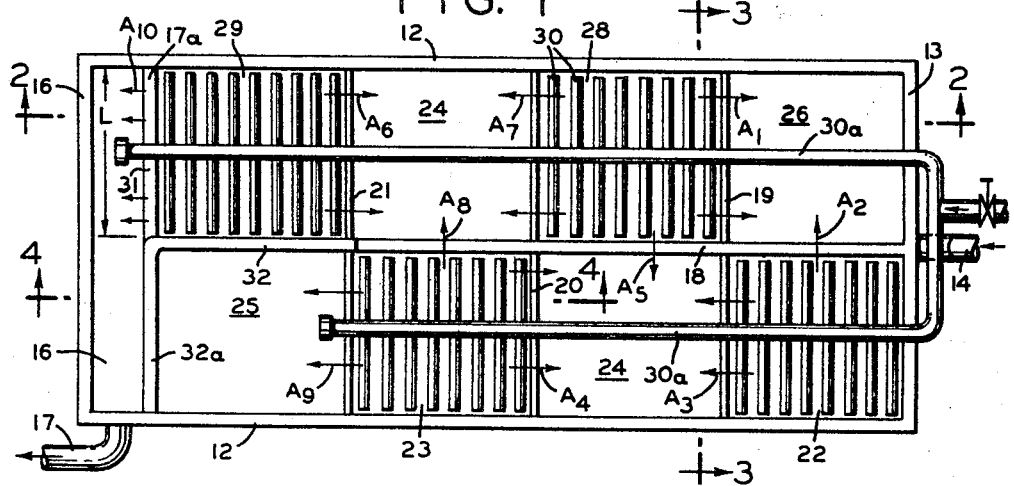
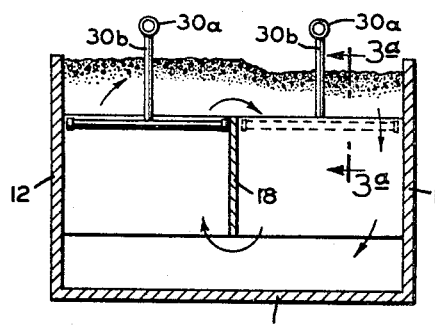
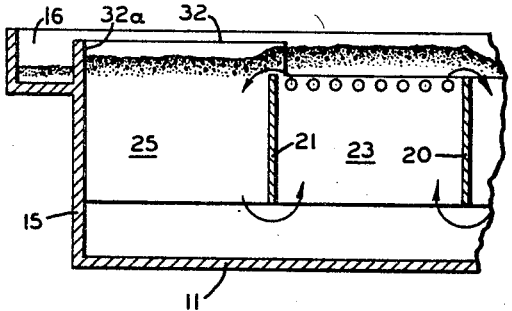
INVENTOR.
GEORGE F. LAMBETH
BY Theodore M. Jablon
ATTORNEY.

United States Patent Office 3,133,130
Patented May 12, 1964

3,133,130
TREATMENT TANK FOR AEROBICALLY
PURIFYING WASTE LIQUIDS
George F. Lambeth, Springdale, Conn., assignor to Dorr-Oliver Incorporated, Stamford, Conn., a corporation of Delaware
Filed Sept. 24, 1959, Ser. No. 842,120
9 Claims. (Cl. 261—123)

This invention relates to the purification treatment of wastes having contaminating putrescible solids and liquids.

More particularly this relates to improvements in the kind of aerobic treatment known as the activated sludge process wherein sewage liquid which may be primary clarifier overflow passing through a treatment tank is subjected to oxygenation as by aeration through suitable submerged gas diffusion means. Purification of the sewage liquid is effected by the aerobic organisms of biologically active flocs in the presence of dissolved oxygen, through an absorption reaction between the sewage matter and these flocs. Generally speaking as the flocs develop progressively they become biologically more effective as to their adsorption capability, and also more effective as to oxygen utilization by these organisms, and thus more effective in achieving purification with respect to the sewage matter on which to feed.

For maintaining this treatment process on a continuous basis, it is therefore general practice to return to the sewage liquid under going aeration treatment, separated activated sludge at a suitable rate, which sludge results as underflow from a sedimentation operation to which the treated or purified effluent of the aeration tank is usually subjected. It is generally desirable that this aerobic return sludge be supplied to the aeration tank as promptly and as fresh as possible in order that an aerobically healthy condition be maintained in the aeration tank the contents of which are kept in a state of agitation and mixture by reason of the air-lifting effect of the gas diffuser means, without the need of any submerged mechanism.

This invention is concerned with the kind of aeration treatment operation that relies solely upon such air-introduction for establishing contact, and encouraging the absorption reaction between the sewage matter and the biologically active flocs. It is among the objects to improve this treatment operation with respect to aeration tank volume requirements, as well as in regard to improving the biological performance relative to oxygen utilization as well as to the aeration power requirements. Thus, it is an object of the invention to achieve improved biological purification effects in a minimum of aeration tank volume with a minimum of air requirements, and at the same time to produce a maximum of well-developed flocs of improved settling characteristics, and thus a readily settleable activated sludge. Another object is to attain maximum floc density in the tank.

Another object is to effect the return transportation of fresh and well-developed flocs immediately after their formation and without undergoing sedimentation, towards the influent end of the tank, and without the need of pumps or the like.

As part of the concept underlying this invention for greater all around efficiency, it is desirable to maintain the oxygen demand distributed as uniformly as possible throughout the body of liquid undergoing aeration from end to end of the tank. In this connection it should be understood that the dissolved oxygen residual at any time and at any point of the liquid body undergoing aeration treatment is the result of the oxygen demand which in turn depends upon the amount of food present for the aerobic organisms, so that the shape of a curve showing the dissolved oxygen level along the path of the net horizontal progress of the sewage liquid through the tank, becomes the indicator of the biological effectiveness of the operation for reasons more fully described below in connection with this object of establishing biologically balanced conditions in the tank.

According to the invention this so-called oxygen profile or graph will, by the degree of the inclination or deviation of the curve or line from the horizontal indicate the extent to which the biological conditions are balanced along the net flow path of liquid from influent to effluent end of tank. Balanced conditions are associated with improved performance such as above set forth, and appear graphically when the line or curve of the oxygen level approaches the horizontal all as will be furthermore explained.

Thus, it is among the objects of this invention to so conduct and control this purification operation, that the line representing the oxygen level will show a minimum irregularity or deviation from the horizontal.

According to some aspects, this invention may be regarded as an improvement over the activated sludge treatment system described in the patent to R. H. Gould No. 2,337,384 of December 21, 1943, which aims to improve the conventional aeration system. The Gould patent recognized that in the conventionally operated aerobic treatment system an unbalance existed in the oxygen supply-oxygen demand relationship where all of the raw feed volume containing all the food for the aerobic organisms entered the treatment system at the influent end of the tank. According to the Gould improvement, lower air requirements, as well as greater load carrying ability in lbs. of B.O.D. per cu. ft. of tank volume, could be achieved when portions of feed volume were added at points spaced forwardly from one another from the inlet end of the tank.

This invention provides an improvement in various respects over the activated sludge treatment disclosed in the Gould patent which aims to improve a biologically unbalanced condition existing at the feed end of the conventionally operated tank and to some extent persisting along the entire path of the liquid to the effluent end. In the conventional tank this unbalance is due to the fact that upon initial contact at the influent end of the raw waste matter with the activated sludge, there is present a great deal more food for the aerobic organisms associated with the already formed biologic flocs, than can be assimilated by these organisms in the feed zone of the tank. This condition in turn creates a very high initial oxygen demand much greater than can be satisfied by the amount of dissolved oxygen that can be made available in the mixture. Consequently, with this initial excess of food in the presence of a relatively insufficient amount of oxygen available, the organisms cannot use their purifying potential or capacity to the fullest. Accordingly, this overload or shock-load together with the initial oxygen starvation retards the purifying effect of the organisms and thereby retards the stabilization of the organic matter or load thus applied. But as the sludge mixture advances along its net flow path horizontally, towards the end of the tank, the food supply and consequently also the oxygen demand diminish, which in turn is responsible for an unnecessarily high level of unutilized dissolved oxygen in the effluent zone of the tank. With this generally unbalanced condition, the dissolved oxygen level in the conventionally operated tank rises from zero at the inlet end to a maximum at the outlet end, which depresses the operating efficiency both as to tank volume utilization, and biological purification capacity of the treatment unit. Such a condition graphically in term of the dissolved oxygen profile presents itself as a line rising from zero value to a maximum.

According to the Gould improvement, if the raw feed is introduced in separate stages or portions at points along the longitudinal net flow path in the tank, the above unbalanced condition is partially remedied due to the effect of spreading of the raw waste load and accordingly of the oxygen demand along the tank in the direction towards the effluent end. In this way, even though the oxygen demand is thus somewhat balanced throughout the tank, there still exist a marked difference in oxygen levels between different parts of the tank and particularly also between the conditions prevailing at the respective ends of the tank.

According to the invention this condition can be further significantly improved both as to tank utilization as well as biological performance. Consequently, the invention overcomes several drawbacks of the Gould method of operation. One such drawback is that the raw feed is successively added along the tank so that the time of contact of activated sludge solids or biologically active flocs with the raw sewage matter is more and more diminished inasmuch as the flow velocity is compounded with each increment of feed added to the tank. Another drawback is that the more fully developed or advanced biologic flocs which are biologically more effective in stabilizing the raw sewage matter, are found more or less only near the effluent zone and hence far remote from the influent end of the tank.

According to the invention, a factor relative to increasing both the biological and the tank efficiency lies in quickly and continuously re-distributing the more fully developed flocs from the outlet zone in the tank back through the body of sludge undergoing aeration in the tank.

To attain that condition, a manner of floc recirculation is employed by this invention internally of the tank whereby at least a portion of the more fully developed biologic flocs are continuously urged in an upstream direction and transported backwards towards the inlet end of the tank through a series of communicating treatment zones each of which in itself provides effective circulation in a body of liquid defined by the respective zone, which circulation is produced solely by means of air-diffusing air lift means in each respective zone, without the aid mechanism.

The maximum effective contact of the sewage matter with the biologically active sludge is achieved by this internal backflow movement super-imposed relative to the net forward movement of the liquid through the tank.

In this way, the invention makes possible a more effective adsorption or attachment of finely suspended as well as dissolved polluting matter to already formed biologic flocs directly in the tank, thus utilizing the purification potential of these flocs directly and immediately, that is without requiring them to be subjected to the settling operation and to a corresponding time delay. The resulting improved adsorption effect which is followed by the oxidizing reaction, is due to the fact that the rate of attachment or adsorption increases with any increase in the ratio of the presence of the adsorbent biologic floc to the presence of the suspended substances or solids to be absorbed by the flocs. Thus, the adsorption phase is intensified throughout the length of the tank between the influent and the effluent end, so that in a given tank volume per unit of time there is produced an average improved floc quality capable of more effective net removal of polluting organic matter at relatively more efficient oxygen utilization. Cumulative advantages result from the uniform distribution of this favorable floc condition achieved by the continuous upstream transportation of the formed biologic flocs from a later treatment zone to an earlier treatment zone in the tank. Also, a greater concentration of flocs thus prevails throughout the tank.

Cumulatively, the advantages lie in an increased capacity to remove B.O.D. per unit of tank volume per unit of time, improved settleability of the final floc in a secondary clarifier, and again the improved effects upon the B.O.D. removal by such flocs supplies in the return sludge necessary to maintain effective healthy operation of the aeration tank biologically.

Further cumulative advantages are attained by this invention with respect to establishing optimum biological balance in the tank as a whole, whereby the overall efficiency is even further enhanced. This is accomplished by introducing portions of the raw feed and/or portions of the activated return sludge into respective operating zones where these stage-wise additions are subjected in a novel manner to the aforementioned backflow or internal recirculation effects that cause the backward transportation of biologically active flocs.

The invention as above set forth can be carried out in a variety of apparatus embodiments some of which is herein illustrated exemplifying apparatus features of the invention.

The improved mode of operation as hereinafter exemplified for aerobically purifying waste liquids carrying waste matter as well as biologically active flocs, is carried out by maintaining in the tank a first plurality of upflow zones with upflow inducing air diffuser means to oxygenate the liquid, maintaining in the tank another plurality of downflow zones hydraulically inter-communicating with each other and with the upflow zones, and maintaining in each upflow zone simultaneous circulation in more than two directions with respectively adjoining downflow zones. As a result of this mode of operation, not only is the raw waste matter effectively contacted with biologically active flocs, but also there is effected a migration of flocs rearwardly through a sequence of zones in the tank, producing the beneficial effects above set forth and further to be explained below in combination with the description of the drawings.

For carrying out this mode operation, in one apparatus embodiment of the invention there is provided an arrangement of submerged partition means preferably spaced from the tank bottom to provide flow passages. The arrangement of these partition means is such as to provide in the tank, preferably, a staggered sequence of upflow sections, and correspondingly a staggered sequence of downflow sections, preferably constituting a checkerboard-like pattern of such zones.

The overall efficiency of the operation is even further enhanced by a combination of this invention with the stepwise introduction taught by Gould of raw feed as above set forth. Accordingly, the respective portions of raw feed are introduced into the respective sequential aeration treatment zones of this invention, thus to be subjected to the effect of the internal backflow tendency with rearward migration of the biologically active flocs.

Other features and advantages will hereinafter appear.

The novel features which are considered as characteristic of the invention are set forth in particular in the appended claims. The invention itself, however, both as to its construction and its method of operation, together with additional objects and advantages thereof will be best understood from the following description of specific embodiment when read in connection with the accompanying drawings, in which:

FIG. 1 is a plan view of one embodiment of the tank exemplifying the invention by illustrating staggered arrangement of the treatment zones, with flow arrows indicating the manner of rearward floc migration;

FIG. 2 is a longitudinal sectional view taken on line 2—2 of FIG. 1;

FIG. 3 is a cross-sectional view of the tank taken on line 3—3 of FIG. 1;

FIG. 3A shows the air diffuser means in detail.

FIG. 4 is a fragmentary longitudinal sectional view of the effluent end portion of the tank, illustrating certain effluent arrangement.

As shown in the accompanying drawing figures, the treatment tank 10 has a bottom 11, side walls 12 and influent end wall 13 with influent means shown in the form of a raw feed conduit 14, and effluent end wall 15 with effluent trough 16 and discharge conduit 17 for the aerobically treated liquid. The effluent discharges via an overflow 17a which determines the liquid level in the tank.

Within the tank there is provided a substantially submerged partition wall system preferably spaced from the tank bottom so as to provide bottom flow passages. As herein exemplified this partition system comprises a median partition wall 18 extending from end to end of the tank and dividing the same into a pair of elongate sections. A sequence of transverse partition walls 19, 20, 21 intersecting with the median wall, are spaced from another and from the end walls of the tank so that both elongate sections are thereby in turn subdivided each into a series of vertical flow sections. In the one series, upflow sections 22 and 23 alternate with downflow sections 24 and 25, but starting with the initial upflow section 22.

In the adjoining series, downflow sections 26 and 27 alternate with upflow sections 28 and 29, but starting with the initial downflow section 26. Each of the upflow sections is provided with air-diffuser means preferably in the form of a system of parallel diffuser pipes 30 extending in a horizontal plane preferably located at the top end of the upflow sections, and supplied by headers 30a having branch connections 30b with the respective horizontal diffuser pipes or elements 30.

In this way, there is established a staggered arrangement of upflow sections 22, 28, 23, 29 and a correspondingly staggered arrangement of downflow sections 26, 24, 27, 26, altogther constituting the preferred checker-board pattern above indicated.

While there is a net throughflow of liquid from end to end of the tank, there is superimposed upon this forward flow a rearward migration of formed biologically active flocs towards the influent end of the tank, occurring because of a peculiar mode of co-operation with one another of the various upflow and downflow sections above itemized.

This co-operation is as follows:

Liquid at the influent end of the tank and comprising freshly introduced raw waste matter as well as a quantity of biologically active flocs, rises in the upflow aeration section 22 while descending in the section 26. The downflow section 26 being located in a tank corner and bounded by upflow sections 22 and 28 is thereby receiving liquid from two directions at right angles to each other and indicated by rearward flow arrows $A_1$ and lateral flow arrow $A_2$. The downflow section 24 being bounded on three sides by upflow sections 22, 28, 23 receives liquid from three directions indicated by forward arrow $A_3$, rearward arrows $A_4$ and lateral arrows $A_5$. But since at least part of the downflow in section 24 will recirculate through upflow section 28 and also through upflow section 22, some of the recirculated biologically active flocs having reached a somewhat more developed state will reach the initial upflow section 26 thereby producing a relatively greater concentration of flocs for contact with and adsorption of fresh raw waste matter there to be encountered.

The next downflow section 27 operates in a similar manner being bounded on three sides by respective upflow sections receiving liquid correspondingly from three directions, namely, as indicated by rearward arrows $A_6$, forward arrows $A_7$, and lateral arrow $A_8$. Again, it will be seen that even further developed flocs will thus be caused to migrate in a general rearward direction so they may react the next proceeding upflow section 24, and eventually reach the initial upflow section 26.

The terminal upflow section 29 is confined by wall portion 31 providing the overflow 17a and also by wall portion 32 which is higher than wall portion 31, the effluent being indicated by arrows $A_{10}$. Consequently, the effluent from the tank is restricted to an overflow edge of the length "L" substantially corresponding to the width of the terminal upflow section. The terminal downflow section 25 has confining wall portions 32 and 32a shown as of equal height at the top, and receives liquid as indicated by forward flow arrows $A_9$ from the top end of the rearwardly adjoining upflow section 23.

In this way and for the reasons initially set forth, there is brought about by this invention a more uniformly balanced biological condition throughout the tank, along with more efficient oxygen utilization, and greater concentration of relatively more developed and therefore more effective biologically active flocs.

To further take advantage of this invention involving rearward floc migration, raw feed and/or return activated sludge may be introduced into the tank stepwise as by feeding controlled portions thereof respectively into a suitable number of downflow sections. In this way, what partial flows are thus introduced at points spaced along the tank, are equally subjected to the aforementioned migration effects, and will thereby further balance the conditions towards the attainment of further increase in overall operation efficiency of this aerobic purification operation.

It will be understood that the invention is not limited to the number of upflow zones and downflow sections shown in the example, but that this number may be either larger or smaller than shown, and also that flow directing structure may be added in the passages.

For example, a concept whereby internal back migration of flocs is rendered, can be embodied even where there are only two upflow sections and two downflow zones arranged relative to one another as are sections 23, 25, 27 and 29. It will be seen that even with this smaller total number of sections there is embodied the feature that flocs or material that has reached the terminal downflow section 25 will revert to what would then be the initial downflow section 27. In that instance it will be seen that each downflow section is bounded by two upflow sections and hence receives liquid from less than three directions, the section 27 receiving liquid in the direction of arrows $A_6$ and $A_8$, the section 25 receiving liquid in the direction of arrow $A_9$.

While influent conduit 14 is shown arranged centrally of the influent end wall 13, it may also advantageously be placed eccentrically, that is so as the deliver into the space at the foot end of downflow section 26 and even close to corner of the tank.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

I claim:

1. In a treatment tank for aerobically purifying waste liquids carrying raw waste matter and biologically active flocs while passing through the tank from influent to effluent end thereof, an arrangement of submerged partition means spaced from the tank bottom, dividing the tank into at least a pair of elongate sections extending side by side between the ends of the tank, and dividing each elongate section into a series of upflow and downflow sections so arranged in alternation that the upflow sections in the one elongate section are staggered relative to those in the other elongate section, while similarly the downflow sections in the one elongate section are staggered relative to the downflow sections in the other elongate section; and air diffusor means provided in each upflow section for oxygenating as well as impelling the liquid to rise therein whereby oxygenated liquid passes from each upflow section into all downflow sections bounding thereon.

2. The treatment tank according to claim 1, including effluent passage means at the effluent end of the tank, restricted to permit effluent to discharge directly only from the terminal upflow section, while preventing direct discharge from the laterally adjoining terminal downflow section.

3. In a treatment tank for aerobically purifying waste liquids carrying raw waste matter and biologically active flocs while passing through the tank from influent end to effluent thereof; an arrangement of submerged partition means, comprising at least a first partition wall dividing the tank into a pair of elongate sections extending side by side between the ends of the tank, and transverse partition walls intersecting with said first partition wall and spaced so as to divide each elongate section into row of upflow and downflow sections so arranged in alternation that the upflow sections in the one elongate section are staggered relative to those in the other elongate section, while similarly the downflow sections in the one elongate section are staggered relative to the downflow sections in the other elongate zone; and air diffusor means provided in each upflow section for oxygenating as well as impelling the liquid to rise therein whereby oxygenated liquid passes from each upflow section into all downflow sections bounding thereon.

4. The treatment tank according to claim 3, including effluent passage means at the effluent end of the tank, restricted to permit effluent to discharge directly only from the terminal upflow section, while preventing direct discharge from the laterally adjoining terminal downflow section.

5. The arrangement according to claim 3 wherein said air diffuser means for an upflow section comprise a horizontal system of parallel diffuser pipes.

6. The arrangement according to claim 3, wherein said air diffuser means for an upflow section comprise a horizontal system of parallel diffuser pipes located in a plane substantially at the top edges of said submerged partition means.

7. In a treatment tank for aerobically purifying waste liquid in the presence of biologically active flocs while passing through the tank from influent end to effluent end thereof, a system of partition walls dividing the tank into at least a pair of elongate sections extending side by side between said ends of the tank, and dividing each elongate section into a series of upflow and downflow sections so arranged in alternation that the upflow sections in the one elongate section are staggered relative to those in the other elongate section, while similarly the downflow sections in the one elongate section are staggered relative to the downflow sections in the other elongate section, whereby there are also formed transverse rows of upflow and downflow sections, with direct flow communication provided across said partition walls between respective pairs of mutually adjoining upflow and downflow sections providing flow passage from the upflow sections at the top and passage from the downflow sections at the bottom, and with at least one intermediate upflow section communicating at the top with all the adjoining downflow sections, said communication across the partition walls being so constructed and arranged that a portion of the suspension of biologically active flocs is caused to migrate backwardly towards the influent end of the tank as opposed to the general forward flow movement of the liquid towards the effluent end of the tank, whereby said flocs migrate between mutually adjoining vertical sections both in said elongate sections and in said transverse rows; and air diffuser means located in each upflow section for oxygenating the liquid as well as for impelling the same upwardly therethrough substantially uniformly over the entire cross-sectional area of said upflow section, whereby oxygenated liquid passes from each upflow section into all downflow sections bounding thereon and cooperatively communicating therewith.

8. In a treatment tank for aerobically purifying waste liquids in the presence of biologically active flocs while passing through the tank from influent to effluent end thereof, a system of partition walls arranged to provide in said tank at least a pair of elongate sections extending side by side between the ends of the tank, and dividing each elongate section into a series of upflow and downflow sections so arranged in alternation that the upflow sections in the one elongate section are staggered relative to those in the other elongate section, while similarly the downflow sections in the one elongate section are staggered relative to the downflow sections in the other elongate section, whereby there are also formed transverse rows of upflow and downflow sections arranged in alternation with direct flow communication provided across said partition walls between at least one upflow section and some of the adjacent downflow sections at the top, and from at least one downflow section to some of the adjacent upflow sections at the bottom, said communication across the partition walls being so constructed and aranged that a portion of the suspension of biologically active flocs is caused to migrate backwardly towards the influent end of the tank as opposed to the forward flow movement of the liquid towards the effluent end of the tank, whereby said flocs migrate between mutually adjoining vertical sections both in said elongate sections and in said transverse rows; and air diffuser means located in each upflow section for oxygenating the liquid as well as for impelling the same upwardly therethrough substantially uniformly over the entire cross-sectional area of said upflow section, whereby oxygenated liquid passes from each upflow section into all downflow sections bounding thereon and cooperatively communicating therewith.

9. In a treatment tank for aerobically purifying waste liquids carrying raw waste matter and biologically active flocs while passing through the tank from influent to effluent end thereof, a system of partition walls arranged to provide in said tank at least a pair of of elongate sections extending side by side between the ends of the tank, and dividing each elongate section into a series of upflow and downflow sections so arranged in alternation that the upflow sections in the one elongate section are staggered relative to those in the other elongate section, while similarly the downflow sections in the one elongate section are staggered relative to the downflow sections in the other elongate section, whereby there are also formed transverse rows of upflow and downflow sections arranged in alternation with direct flow communication provided across said partition walls between respective pairs of mutually adjoining upflow and downflow sections providing flow passage from the upflow sections at the top and passage from the downflow sections at the bottom in the elongate series as well as in the transverse rows, said communication across the partition walls being so constructed and arranged that a portion of the suspension of biologically active flocs is caused to migrate backwardly towards the influent end of the tank as opposed to the forward flow movement of the liquid towards the effluent end of the tank, whereby said flocs migrate between mutually adjoining upflow sections both in said elongate sections and in said transverse rows; and air diffuser means located in each upflow section for oxygenating the liquid as well as for impelling the same upwardly therethrough substantially uniformly over the entire cross-sectional area of said upflow section, whereby oxygenated liquid passes from each upflow section into all downflow sections bounding thereon and cooperatively communicating therewith.

References Cited in the file of this patent

UNITED STATES PATENTS

| 2,188,162 | Schulhoff | Jan. 23, 1940 |
| 2,272,441 | Streander | Feb. 10, 1942 |
| 2,438,342 | Mallory | Mar. 23, 1948 |
| 2,708,571 | Fischertstrom et al. | May 17, 1955 |